United States Patent [19]

Yamamoto et al.

[11] Patent Number: 5,221,980
[45] Date of Patent: Jun. 22, 1993

[54] METHOD FOR DRIVING FERROELECTRIC LIQUID CRYSTAL LIGHT VALVE OF LIGHT WRITING TYPE

[75] Inventors: Shuhei Yamamoto; Naoki Kato; Teruo Ebihara; Rieko Sekura, all of Tokyo, Japan

[73] Assignee: Seiko Instruments Inc., Japan

[21] Appl. No.: 755,616

[22] Filed: Sep. 5, 1991

[30] Foreign Application Priority Data

Sep. 10, 1990 [JP] Japan .................................. 2-239594

[51] Int. Cl.$^5$ .................................................. G02F 1/13
[52] U.S. Cl. ........................................... 359/56; 359/72
[58] Field of Search ........................ 359/56, 71, 72, 63

[56] References Cited

U.S. PATENT DOCUMENTS

| | | | |
|---|---|---|---|
| 4,351,589 | 9/1982 | Chavel et al. | 359/72 |
| 4,533,215 | 8/1985 | Trias et al. | 359/72 |
| 4,672,014 | 6/1987 | Joiner et al. | 359/72 |
| 4,917,469 | 4/1990 | Ross | 359/56 |

FOREIGN PATENT DOCUMENTS

| | | |
|---|---|---|
| 89001680 | 2/1989 | European Pat. Off. . |
| 89008862 | 9/1989 | European Pat. Off. . |
| 0315723 | 12/1989 | Japan ............................ 359/56 |

OTHER PUBLICATIONS

Applied Optics, vol. 26, No. 2, Jan. 1987, pp. 241-246, P. R. Ashley et al., "Amorphous silicon photoconductor in liquid crystal spatial light modulator".

Patent Abstract of Japan, vol. 14, No. 122 (P-1017), Mar. 7, 1990.

Optics Letters, vol. 15, No. 5, Mar. 1990, pp. 285-287, S. Fukushima et al., "Bistable spatial light modulator using a ferroelectric liquid crystal".

Patent Abstracts of Japan, vol. 15, No. 144 (P-1189), Apr. 11, 1991.

Primary Examiner—William L. Sikes
Assistant Examiner—Huy K. Mai
Attorney, Agent, or Firm—Bruce L. Adams; Van C. Wilks

[57] ABSTRACT

The present invention is concerned with point/output characteristics of a light input image having density gradation using a light writing type light valve comprising a combination of a hydrogenated amorphous silicon photoconductor and a ferroelectric liquid crystal. More specifically, the invention relates to a method of expressing continuous gradation using a light writing type ferroelectric liquid crystal light valve that has been difficult to realize. The expression of continuous gradation is made possible by superposing a DC bias voltage of from 0.1 V to 10 V on a rectangular-wave voltage or a bipolar pulse voltage that has theretofore been used as a driving voltage in order to strongly couple together the spontaneous polarization of ferroelectric liquid crystal and the polarity of the DC voltage, and by eliminating the bistability exhibited by the ferroelectric liquid crystal while developing a monostable condition.

12 Claims, 5 Drawing Sheets

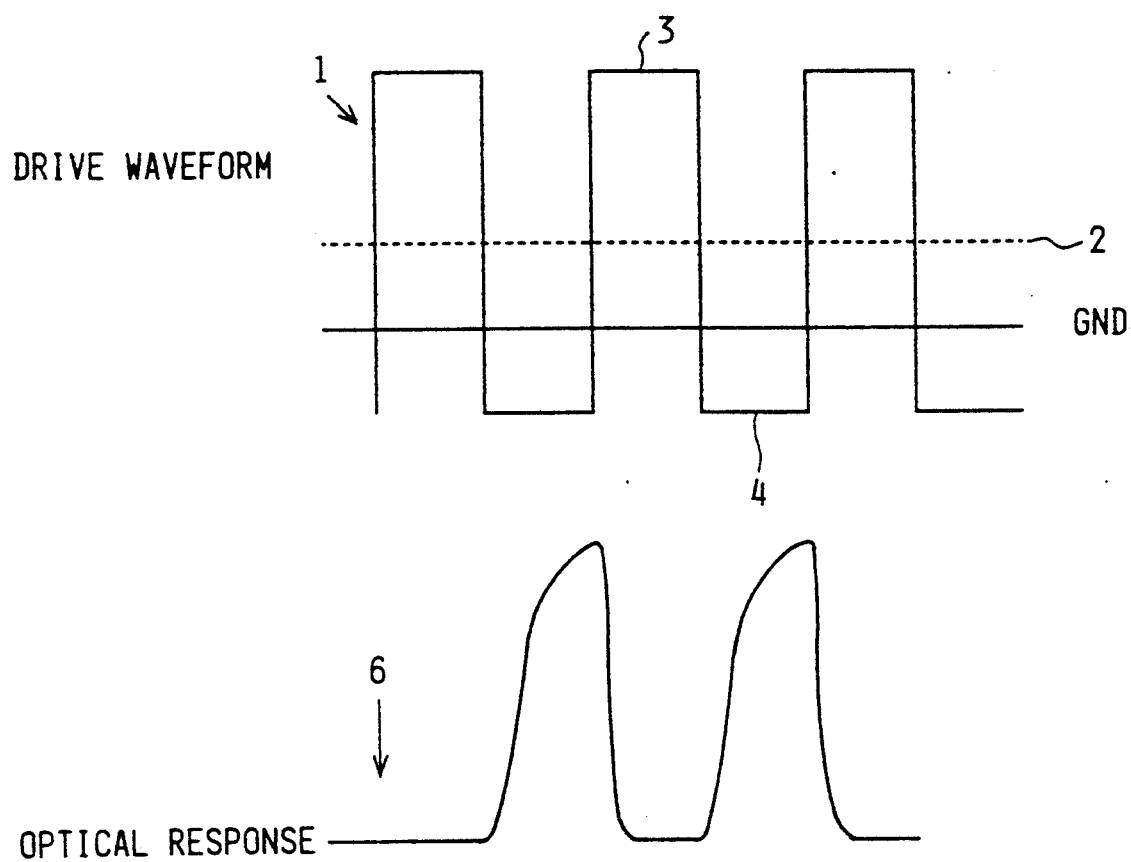

APPLIED VOLTAGE

BRIGHT

OPTICAL RESPONSE

DARK

METHOD FOR DRIVING FERROELECTRIC LIQUID CRYSTAL LIGHT VALVE OF LIGHT WRITING TYPE

BACKGROUND OF THE INVENTION

The present invention relates to a ferroelectric liquid crystal light valve of a light writing type applied to an intermediate image forming medium for a printer, display device, a spatial light modulator for optical information processing, and the like.

The ferroelectric liquid crystal used as a light modulating material for the light writing type ferroelectric liquid crystal light valve can be made in a single crystalline state by allowing the thickness of the liquid crystal layer to be smaller than a helical pitch so as to eliminate the spiral as shown by Clark and Lagerwall. Ferroelectric liquid crystal has a relatively great spontaneous polarization in the uniaxial direction of the molecules, and the liquid crystal molecules are turned along a cone in a direction corresponding to the polarity of the applied voltage, causing the liquid crystal to exhibit clear bistability.

Such a light valve has heretofore been driven by the application of a bipolar voltage or a rectangular-wave voltage. That is, the light valve is driven while a bipolar pulse voltage or a rectangular-wave voltage that is lower than the threshold voltage of the light valve when dark, and greater than the threshold voltage when it is irradiated with write light carrying write information, is being applied to the light valve and read light and the write light are being projected on to the valve at all times.

FIGS. 4 show (a) and (b) a drive waveform and an optical response of the light valve based on a conventional method. The light valve is set in a reflection optical system in crossed-nicols state. A positive voltage is applied for erasing an image over the whole surface of the light valve; a negative voltage is applied for writing image. When the light valve is not irradiated with the write light, it remains nearly in a dark field state even though the negative voltage is applied thereto. When the light valve is irradiated with the write light, however, the liquid crystal molecules turn to the opposite position where the director is stable while negative voltage is being applied and stay in this position. Consequently, necessary information is written and is memorized.

However, because of the bistability which ferroelectric liquid crystal exhibites in conventional driving methods, an input image with gradation is automatically performed by threshold voltage processing and converted into a binary image. Therefore, large portion of the input information is lost, limiting the range of application.

SUMMARY OF THE INVENTION

An object of the invention is to provide a new method of expressing continuous gradation using a light writing type ferroelectric liquid crystal light valve that has been difficult to realize.

In order to solve the above-mentioned problems the present invention employs a driving waveform with DC bias voltage of from 0.1 v to 10 v on a conventional bipolar pulse voltage or a rectangular-wave voltage. It can be accomplished to eliminate the bistability and to establish a monostability in the ferroelectric liquid crystal light valve by strongly coupling the spontaneous polarization of ferroelectric liquid crystal with DC voltage.

The polarity of the pulse voltage or the reactangular-wave voltage that is applied at the time of writing is selected to be opposite to that of the DC bias voltage and the voltage level is set to a suitable height. Then, the directors of the liquid crystal molecules are turned along the cone at the time of writing using light, and the turning angle is continuously controlled depending upon the intensity of write light, making it possible to express the image with gradation. In the case of the light valve having a dielectric mirror, the light does not irradiate the photoconductor even when the intensity of the read light is increased. Namely, write characteristics of the light valve are not affected by the read light and a bright and clear read image is obtained.

To read the image that is written, the light valve is so placed in a reflection optical system in a crossed-Nicols state that the directions of optical axes of the liquid crystal molecules oriented in the direction and monostabilized by the DC bias voltage are in parallel with or perpendicular to the transmission axis of a polarizer. When the image is erased, a dark field state is established to exhibit the most favorable contrast.

When the light valve is so disposed that a bright field state is established in erasing an image, and the contrast lowers considerably.

When a thin layer of ferroelectric liquid crystal thinner than its inherent helical pitch is used in order to eliminate the helix and to arrange it in a single crystalline state and when a bipolar pulse voltage or a rectangular-wave voltage higher than a predetermined value is applied thereto, then the spontaneous polarization possessed by the liquid crystal strongly couples with the polarity of the applied voltage to exhibit a bistability. Even when the light writing type ferroelectric liquid crystal light value is combined with the photoconductor, basically the same characteristics are exhibited. When the applied voltage, intensities of read light and of write light are set to suitable values, therefore, the binary input image is written and memorized in the form of binary data as it is. When the input image has gradation, the image that is written is converted into a binary form according to the pulse threshold possessed by the light valve and stored. When a voltage on which a DC voltage is superposed is applied, on the other hand, the DC voltage is coupled strongly with the spontaneous polarization of the ferroelectric liquid crystal, and the state where molecules are turned in the direction corresponding to the polarity of the DC voltage becomes very stable but molecules directed in the direction of the opposite polarity are instable. Therefore, when the polarity of the pulse voltage or the rectangular-wave voltage is selected to be opposite to that of the DC bias voltage at the time of writing and when the voltage level is set to a suitable magnitude, the liquid crystal molecules are turned along the cone at the time of writing using light and the turning angle is continuously controlled depending upon the intensity of write light making it possible to express the image having gradation.

BRIEF DESCRIPTION OF THE DRAWINGS

FIGS. 1(a) and 1(b) are diagrams showing the drive waveform and optical response characteristics of a ferroelectric liquid crystal light valve of a light writing type according to the present invention, wherein FIG.

1(a) shows optical response characteristics when the read light only is irradiated, and FIG. 1(b) shows optical response characteristics when the write light and read light are both irradiated;

DETAILED DESCRIPTION OF THE PREFERRED EMBODIMENTS

Figure 2:
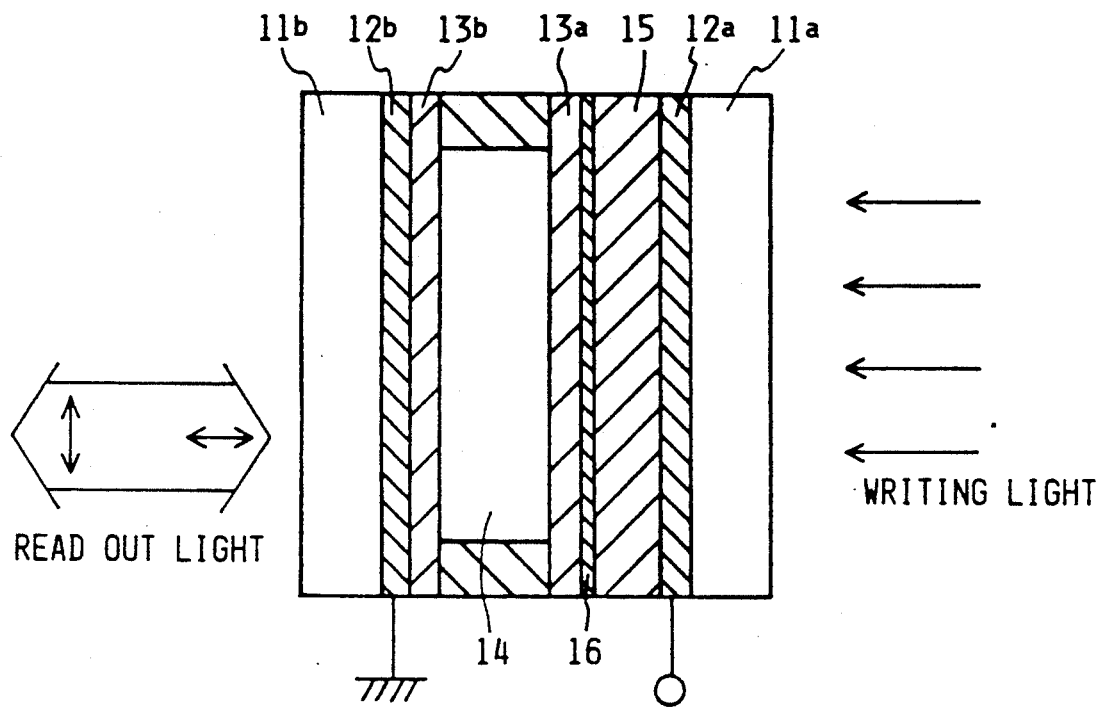
FIG. 2 is a sectional view which schematically shows the constitution of the ferroelectric liquid crystal light valve of the light writing type used for the present invention.

The present invention will now be described in detail in conjunction with the drawings. FIG. 2 is a diagram which schematically illustrates the structure of a light writing type ferroelectric liquid crystal light valve employed in the present invention. Substrates 11a and 11b for holding the liquid crystal molecules therebetween are of transparent glass substrates which have thicknesses of 4 mm and of which the both surfaces are polished to a flatness of smaller than a quarter of the wavelength. On the surfaces of the two substrates are provided ITO transparent electrode layers 12a and 12b. On the transparent electrode layer 12a of the light writing side is formed a hydrogenated amorphous silicon (a-Si:H) photoconductive layer 15 of a thickness of 3 μm by decomposing a gas containing chiefly $SiF_4$ by electric discharge. Furthermore, a dielectric mirror 16 is formed on the above layer. On the surface of the two substrates are further provided alignment layers 13a and 13b by obliquely depositing silicon monoxide at an incident angle of 85° to the normal of the substrates in a manner that the directions of incidence on the substrates are in agreement with each other on the write side and on the read side under a combined condition. Next, silica balls having an average particle size of 1.0 μm are mixed and dispersed in the peripheral sealing material, which is then applied onto the two substrates by a offset printing method to adhere them together in such a way that a gap for holding the ferroelectric liquid crystal therein is defined. As a ferroelectric liquid crystal mixture 14, there is used SCE-6 (produced by BDH Co.) or F005 (produced by Hoechst Co.) which is injected by vacuum method in an isotropic phase, and is gradually cooled to enter a smectic C phase to obtain uniform orientation.

Figure 3:
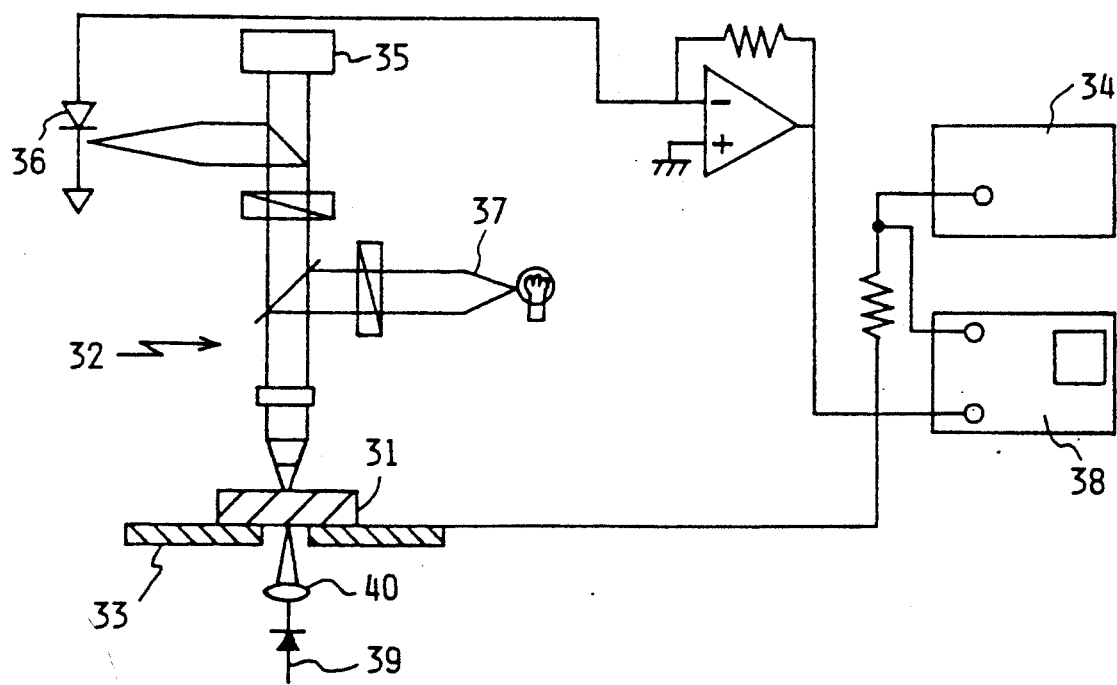
FIG. 3 is a system diagram showing a write/read optical system for the ferroelectric liquid crystal light valve of the light writing type used for the present invention.
Figure 4A:
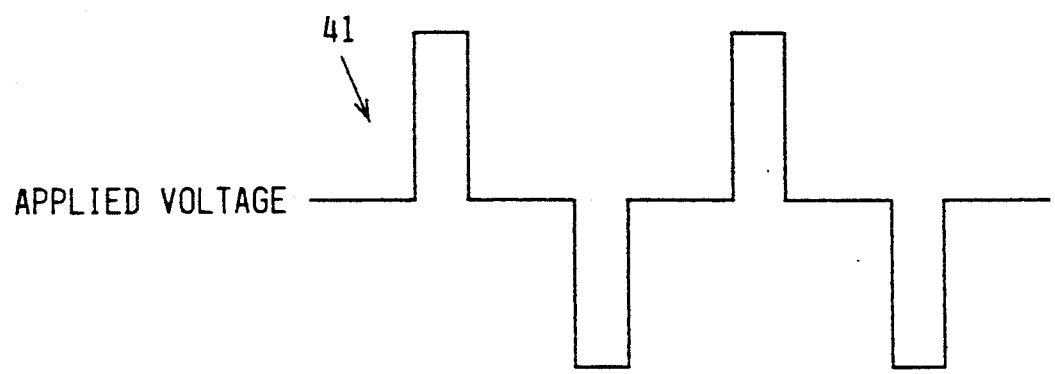
FIGS. 4(a) and 4(b) are diagrams of optical response characteristics of the ferroelectric liquid crystal light valve of the light writing type by a conventional driving method.
Figure 4A:
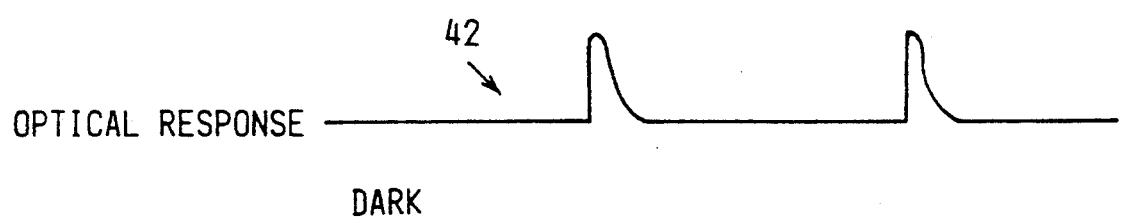
Figure 4B:
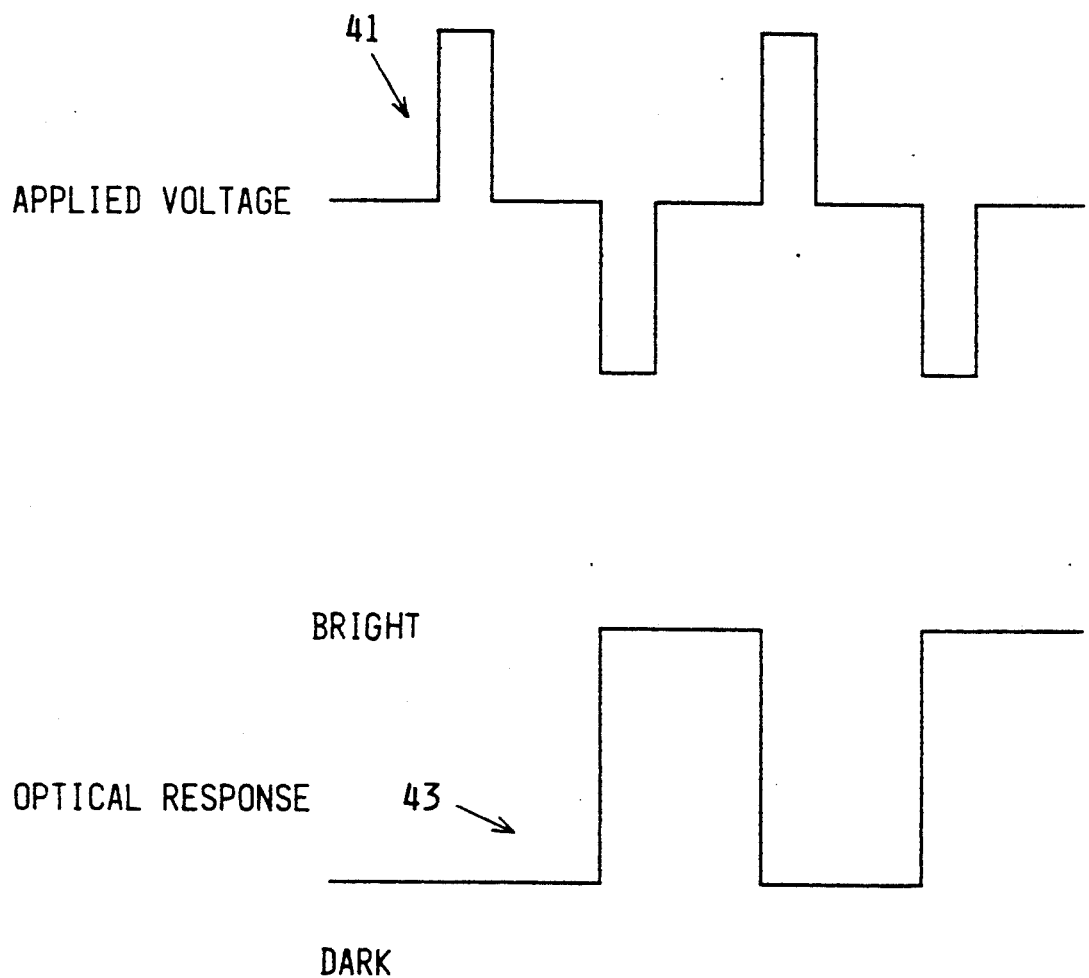

The operation characteristics of the thus fabricated light valve was evaluated. FIG. 3 is a diagram of an optical system used for conducting the write and read experiments. The light valve 31 is set on a stage 33 of a reflection type polarization microscope 32 in which a polarizer and an analyzer are set at crossed-Nicols state, and bipolar pulse voltages 34 are applied across the transparent electrodes. A PIN photodiode 36 is set on the focal plane of an eye-piece 35 of the polarization microscope, and the optical response of the falling light 37 modulated by the light valve and reflected is detected by the PIN photodiode, and is displayed on an oscilloscope 38 together with the waveform of the applied voltage. FIG. 4 shows optical response characteristics using a conventional drive waveform which consists of bipolar pulses 41 of 20 $V_{p-p}$ having a pulse width of 1 ms and a drive frequency of 200 Hz. FIG. 4a shows an optical response when the light valve is illuminated with the falling light only and FIG. 4b shows an optical response when the light valve is illuminated with the falling light in combination with the projected light. The falling light corresponds to light for reading information written on the light valve and the projected light corresponds to the write light. It was confirmed that monostability 42 is exhibited in the case of the falling light only and that very favorable bistability 43 is exhibited when the projected light is added to the above light. Under this condition, a resolution chart 40 without gradation such as a US Air Force test target was disposed between the projected light 39 that corresponds to the write light and the light valve, and the write image was observed using the polarization microscope; i.e., highly accurate write image of greater than 150 l p/mm was observed. Next, an image having gradation was photographed and information was written in the same manner as above using a negative film thereof as a target. The image that was read was completely converted into a binary form which was almost not identifiable.

The present inventors have conducted intensive study in an attempt to realize gradation expression using the ferroelectric liquid crystal light valve of a light write-type, and have discovered the fact that this can be realized by using a drive waveform consisting of a conventional drive waveform on which the DC bias voltage is superposed.

Figure 1A:
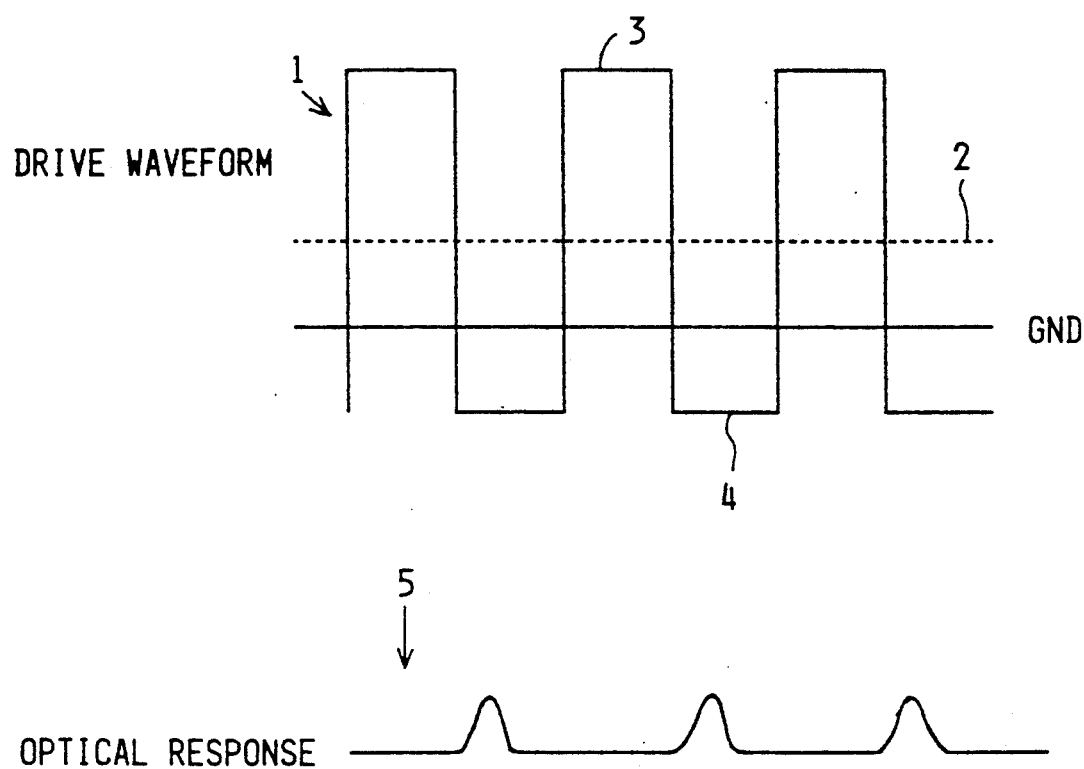

FIGS. 1(a) and 1(b) are diagrams showing a drive waveform of the light valve of the present invention and optical response characteristics of the light valve placed between crossed-Nicols.

FIG. 1a shows an applied voltage and optical response when the light valve is impressed with a rectangular-wave voltage 1 and is illuminated with falling light, and FIG. 1b shows an applied voltage and optical response when the light valve is impressed with the rectangular-wave voltage 1 and is illuminated with projected light in addition to the falling light.

When the light valve is illuminated with the falling light only, the optical response 5 that is exhibited is nearly the same as that of the case when there is no DC bias voltage. When the light valve is illuminated with the projected light in addition to the falling light, the optical response characteristics 6 become very different from those of the case when there is no DC bias. That is, the ferroelectric liquid crystal molecules are stabilized little even during the period in which a negative voltage 4 corresponding to the write voltage is applied. As soon as the DC bias voltage is applied thereafter, the directors of the liquid crystal molecules are quickly turned back, and the image that is written disappears. Even when the light valve is driven by the rectangular-wave voltage on which the DC voltage is superposed, the directors of the liquid crystal molecules are quickly turned when a voltage 3 of an opposite polarity supported by the DC bias voltage 2 is applied, resulting in that the image written by the voltage 4 disappears.

The write light, read light, applied pulse voltage or rectangular-wave voltage and the DC bias voltage was adjusted to suitable magnitudes, the image having gradation photographed, and an image was written using the negative film thereof as a target. The image that was read had the same gradation as that of the target, and the resolution (100 l p/mm) was nearly the same as that of the case when the image was written without applying the DC bias voltage, giving very good results. A proper DC bias voltage applied for expressing the gradation lies in a range of from 0.1 V to 10 V. If the voltage exceeds the above range, the layer structure of liquid crystal is destroyed, making it difficult to continue normal operation. A dark field state is established after the image is erased and the most favorable contrast is exhibited when the written image is read out in the reflection optical system in which a polarizer and an analyzer are set in crossed-Nicols state where the direction of optical axis of liquid crystal molecules stabilized by the DC bias voltage is in parallel with or perpendicular to the transmission axis of the polarizer. A maximum contrast ratio of 20:1 is obtained. When an arrangement is so made that bright field is obtained after the image is erased, the contrast decreases drastically. When the image is written using a binary target such as a USAF test chart, the image that is read out is completely transformed into a binary form.

When the driving method of the present invention is adapted to the ferroelectric liquid crystal light valve having a dielectric mirror consisting of fourteen layers of silicon and $SiO_2$, there can be expressed image information which is brighter with better gradation and higher contrast. The image that is read is a so-called negative image in which the portions irradiated with the write light become bright. If the polarity of the DC bias to be applied is brought in agreement with the polarity of the pulse voltage at the time of writing, the stable state of the liquid crystal molecules is reversed and the background becomes bright. It is also possible to output a so-called positive image in which the portions irradiated with the write light become dark where the molecules are inverted in the opposite direction due to the multiplier effect of the write light and the read light.

As described above, the driving method of the present invention makes it possible to obtain a read image with continuous gradation using the liquid crystal light valve of a light crystal that has hitherto been considered impossible. The invention therefore improves performance and widens application range of an incoherent-/coherent converter or the like employed for an intermediate image-forming medium of printers, for a display device, and for optical information processing.

What is claimed is:

1. A method of driving and reading a light writing crystal light valve having a ferroelectric liquid crystal sealed in a gap between a pair of transparent substrates, a first transparent electrode formed on the inner surface of one transparent substrate, a second transparent electrode formed on the inner surface of the other transparent substrate, a photoconductive layer formed adjacent to the first transparent electrode, and alignment layers formed on respective inner sides of the pair of transparent substrates, the method comprising the steps of:
    applying bipolar pulse voltages, on which is superimposed a DC voltage as a bias voltage, between said first and second transparent electrodes;
    irradiating writing light including an intensity of light corresponding to an image that is written onto the light valve; and
    irradiating read out light onto the light valve to read out the written image while the light valve is driven.

2. A method of driving and reading a light writing liquid crystal light valve according to claim 1; wherein the writing light has an intensity distribution corresponding to an image.

3. A method of driving and reading a light writing liquid crystal light valve according to claim 1; wherein the superimposed DC voltage has a range between 0.1 volt and 10 volts.

4. A method of driving and reading a light writing liquid crystal light valve according to claim 1; wherein the ferroelectric liquid crystal comprises one of SCE-6 and F005.

5. A method of driving and reading a light writing liquid crystal light valve according to claim 1; wherein the photoconductive layer comprises a hydrogenated amorphous silicon photoconductive layer, and wherein the liquid crystal light valve has a dielectric mirror layer disposed between the photoconductive layer and the alignment layer.

6. A method of driving and reading a light writing liquid crystal light valve according to claim 1; further comprising the steps of reading out an image from the liquid crystal light valve by disposing the light valve in an optical system before driving the light valve, the optical system having a polarizer and an analyzer orientated at a cross Nicols state, and setting the light valve to have a dark state by arranging the optical system so that the liquid crystal mixture has a cross Nicols state when the polarity of the bipolar pulse voltage corresponds to the DC voltage.

7. A method of driving and reading a light writing liquid crystal light valve having a ferroelectric liquid crystal mixture sealed between a pair of transparent substrates, each transparent substrate having a transparent electrode formed on the inner surface thereof facing the liquid crystal mixture, a photoconductive layer disposed adjacent to one of the transparent electrodes, and an alignment layer formed on the inner surface of each transparent substrate, the method comprising the steps of: applying a bipolar pulse voltage, having a superimposed DC voltage as a bias voltage, between the transparent electrodes; irradiating a writing light onto the light valve; and irradiating a read-out light onto the light valve while the light valve is driven.

8. A method of driving and reading a light writing liquid crystal light valve according to claim 7; wherein the writing light has an intensity distribution corresponding to an image.

9. A method of driving and reading alight writing liquid crystal light valve according to claim 7; wherein the superimposed DC voltage has a range between 0.1 volt and 10 volts.

10. A method of driving and reading a light writing liquid crystal light valve according to claim 7; wherein the ferroelectric liquid crystal comprises one of SCE-6 and F005.

11. A method of driving and reading a light writing liquid crystal light valve according to claim 7; wherein the photoconductive layer comprises a hydrogenated amorphous silicon photoconductive layer, and wherein the liquid crystal light valve has a dielectric mirror layer disposed between the photoconductive layer and the alignment layer.

12. A method of driving and reading a light writing liquid crystal light valve according to claim 7; further comprising the steps of reading out an image from the liquid crystal light valve by disposing the light valve in an optical system before driving the light valve, the optical system having a polarizer and an analyzer orientated at a cross Nicols state, and setting the light valve to have a dark state by arranging the optical system so that the liquid crystal mixture has a cross Nicols state when the polarity of the bipolar pulse voltage corresponds to the DC voltage.

* * * * *